United States Patent
Du et al.

(10) Patent No.: US 10,178,216 B2
(45) Date of Patent: Jan. 8, 2019

(54) METHOD AND APPARATUS FOR IMPLEMENTING UNIFIED MANAGEMENT OF INTELLIGENT HARDWARE DEVICES BY APP, AND CLIENT

(71) Applicant: Beijing Qihoo Technology Company Limited, Xicheng District (CN)

(72) Inventors: Baojiang Du, Beijing (CN); Wei Chen, Beijing (CN); Qianqiani Zhang, Beijing (CN); Kai Wu, Beijing (CN); Xiangzhen Zheng, Beijing (CN)

(73) Assignee: Beijing Qihoo Technology Company Limited, Xicheng District (CN)

( * ) Notice: Subject to any disclaimer, the term of this patent is extended or adjusted under 35 U.S.C. 154(b) by 0 days.

(21) Appl. No.: 15/540,966

(22) PCT Filed: Nov. 19, 2015

(86) PCT No.: PCT/CN2015/095017
§ 371 (c)(1),
(2) Date: Jun. 29, 2017

(87) PCT Pub. No.: WO2016/107327
PCT Pub. Date: Jul. 7, 2016

(65) Prior Publication Data
US 2018/0007189 A1    Jan. 4, 2018

(30) Foreign Application Priority Data
Dec. 29, 2014  (CN) .......................... 2014 1 0837563

(51) Int. Cl.
*H04B 7/00*  (2006.01)
*H04M 1/725*  (2006.01)
(Continued)

(52) U.S. Cl.
CPC ........ *H04M 1/72533* (2013.01); *H04L 67/12* (2013.01); *H04M 1/725* (2013.01);
(Continued)

(58) Field of Classification Search
CPC ........... H04M 1/72533; H04M 1/7253; H04M 2250/52; H04W 4/80; H04W 4/008
(Continued)

(56) References Cited

U.S. PATENT DOCUMENTS 9,800,429 B2 * 10/2017 Crayford ............. H04L 12/2803
9,883,362 B2 *  1/2018 Lim ........................ H04M 3/54
(Continued)

FOREIGN PATENT DOCUMENTS

CN        102360210 A       2/2012
CN        102692881 A       9/2012
(Continued)

OTHER PUBLICATIONS

Chinese Patent Office, Decision of Rejection of CN 201410837563. 6, dated Sep. 1, 2016.
(Continued)

*Primary Examiner* — Edward Urban
*Assistant Examiner* — Max Mathew
(74) *Attorney, Agent, or Firm* — LKGlobal | Lorenz & Kopf, LLP

(57) ABSTRACT

The present invention discloses a method, a device and a mobile browser client for realizing centralized management of intelligent hardware devices by an APP, wherein the method comprising: identifying identification information of an intelligent hardware device via an identification interface provided by an APP on a mobile terminal; based on the information identifying, establishing a bluetooth connection between the mobile terminal and the intelligent hardware device; acquiring, by the APP, hardware controlling infor-
(Continued)

mation of the intelligent hardware device through the bluetooth connection; and providing, in the APP, a display interaction interface which is based on the hardware controlling information.

17 Claims, 9 Drawing Sheets

(51) Int. Cl.
*H04W 4/80* (2018.01)
*H04W 12/06* (2009.01)
*H04L 29/08* (2006.01)
*H04L 29/06* (2006.01)

(52) U.S. Cl.
CPC ........... *H04M 1/7253* (2013.01); *H04W 4/80* (2018.02); *H04W 12/06* (2013.01); *H04L 29/06* (2013.01); *H04M 2250/52* (2013.01)

(58) Field of Classification Search
USPC ....................................................... 455/41.2
See application file for complete search history.

(56) References Cited

U.S. PATENT DOCUMENTS

| | | | |
|---|---|---|---|
| 2014/0059603 A1 | 2/2014 | Lee | |
| 2015/0222517 A1* | 8/2015 | McLaughlin | H04W 4/70 713/156 |
| 2015/0365780 A1* | 12/2015 | Xie | H04W 4/008 455/41.2 |
| 2016/0344679 A1* | 11/2016 | Lane | G06F 17/212 |
| 2016/0371258 A1* | 12/2016 | Gan | G06F 17/30011 |
| 2017/0118789 A1* | 4/2017 | Lee | H04W 76/025 |
| 2017/0374186 A1* | 12/2017 | Velusamy | G06F 3/0619 |

FOREIGN PATENT DOCUMENTS

| | | |
|---|---|---|
| CN | 103593635 A | 2/2014 |
| CN | 103824099 A | 5/2014 |
| CN | 103973787 A | 8/2014 |
| CN | 104035403 A | 9/2014 |
| CN | 104125342 A | 10/2014 |
| CN | 104618574 A | 5/2015 |
| WO | 2014124014 A1 | 8/2014 |

OTHER PUBLICATIONS

International Bureau of WIPO, International Search Report and Written Opinion in Application No. PCT/CN2015/095017, dated Feb. 22, 2016.
Chinese Patent Office, First Office Action of CN 201410837563.6, dated Jan. 21, 2016.
Chinese Patent Office, Second Office Action of CN 201410837563.6, dated May 9, 2016.

* cited by examiner

METHOD AND APPARATUS FOR IMPLEMENTING UNIFIED MANAGEMENT OF INTELLIGENT HARDWARE DEVICES BY APP, AND CLIENT

CROSS-REFERENCE TO RELATED APPLICATION

This application is a U.S. National-Stage entry under 35 U.S.C. § 371 based on International Application No. PCT/CN2015/095017, filed Nov. 19, 2015, which was published under PCT Article 21(2) and which claims priority to Chinese Patent Application No. 201410837563.6, filed Dec. 29, 2014, which are all hereby incorporated in their entirety by reference.

TECHNICAL FIELD

The present invention pertains to the field of computer technology, and particularly relates to a method, a device and a mobile browser client for realizing centralized management of intelligent hardware devices by an APP (Application).

BACKGROUND

Along with the constant improvement of the infrastructure of the mobile internet, and the development of novel man-machine interaction techniques and novel sensing techniques, intelligent hardware devices have become a hot spot of the intelligent terminal industry, and their areas of application keep increasing. Especially, various intelligent hardware devices of wearable type are continuously emerging.

The function of intelligent hardware devices is to impact the behavior of a user by gathering, calculating and feeding back the behavior data relevant to the user. In the prior art, the user usually manages an intelligent hardware device by using the APP corresponding to the intelligent hardware device, that is, adopts a one-for-one device management model. When the user uses multiple intelligent hardware devices, multiple APPs that are individually corresponding to multiple intelligent hardware devices must be installed on the mobile device, and the operation process is very complicated, time consuming and labor intensive.

In addition, other objects, desirable features and characteristics will become apparent from the subsequent summary and detailed description, and the appended claims, taken in conjunction with the accompanying drawings and this background.

SUMMARY

The present invention is proposed in view of the above problems to provide a method and device for acquiring a similar human face picture and a method and device for acquiring information about a human face picture, which can solve or at least partly solve the above problems.

According to an aspect of the present invention, there is provided a method for realizing centralized management of intelligent hardware devices by an APP, wherein the method includes, but is not limited to:

identifying identification information of an intelligent hardware device via an identification interface provided by an APP on a mobile terminal;

establishing a bluetooth connection between the mobile terminal and the intelligent hardware device based on the information identifying;

acquiring, by the APP, hardware controlling information of the intelligent hardware device through the bluetooth connection; and providing, in the APP, a display interaction interface which is based on the hardware controlling information.

According to another aspect of the present invention, there is provided a device for realizing centralized management of intelligent hardware devices by an APP, wherein the device includes, but is not limited to:

an identification unit, adapted for identifying identification information of an intelligent hardware device via an identification interface provided by an APP on a mobile terminal;

a bluetooth connection establishing unit, adapted for, establishing a bluetooth connection between the mobile terminal and the intelligent hardware device based on the information identifying;

an interaction unit, adapted for, acquiring hardware controlling information of the intelligent hardware device, through the bluetooth connection; and an interface unit, adapted for providing, in the APP, a display interaction interface which is based on the hardware controlling information.

According to yet another aspect of the present invention, there is provided a mobile browser client, wherein the mobile browser client includes, but is not limited to:the device for realizing centralized management of intelligent hardware devices by an APP as described above.

According to still another aspect of the present invention, there is provided a computer program comprising a computer readable code, which causes a computing device to execute the method for realizing centralized management of intelligent hardware devices by an APP as described above, when the computer readable code is running on the computing device.

According to still another aspect of the present invention, there is provided a non-transitory computer readable medium that stores the computer program as described above.

It can be known from the above that, in the technical solutions provided by the present invention, the process of information identifying, bluetooth connecting, hardware controlling information acquiring and interaction interface providing are executed between an APP on a mobile terminal and an intelligent hardware device. Because the interaction process relies on the identification interface provided by the APP, the restriction of the one-for-one management model between APPs and intelligent hardware devices in the prior art is broken through, and the management of one APP for multiple intelligent hardware devices can be realized, which simplifies the operation process, and provides the user a more convenient and intuitive experience of intelligent hardware device management.

The above description is merely an overview of technical solutions of the present invention. In order to more apparently understand the technical solutions of the present invention and implement them in accordance with the contents of specification, and to more readily understand above and other objectives, features and advantages of the present invention, particular embodiments of the present invention are provided hereinafter.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Exemplary embodiments of the present invention will be described in more detail below with reference to the accompanying drawings. Although the accompanying drawings display the exemplary embodiments of the present invention, it should be understood that the present invention may be implemented in various forms and not limited by the embodiments set forth herein. Instead, these embodiments are provided to facilitate those skilled in the art more thoroughly understand the present invention, and completely convey the scope of the present invention to them.

Figure 1:
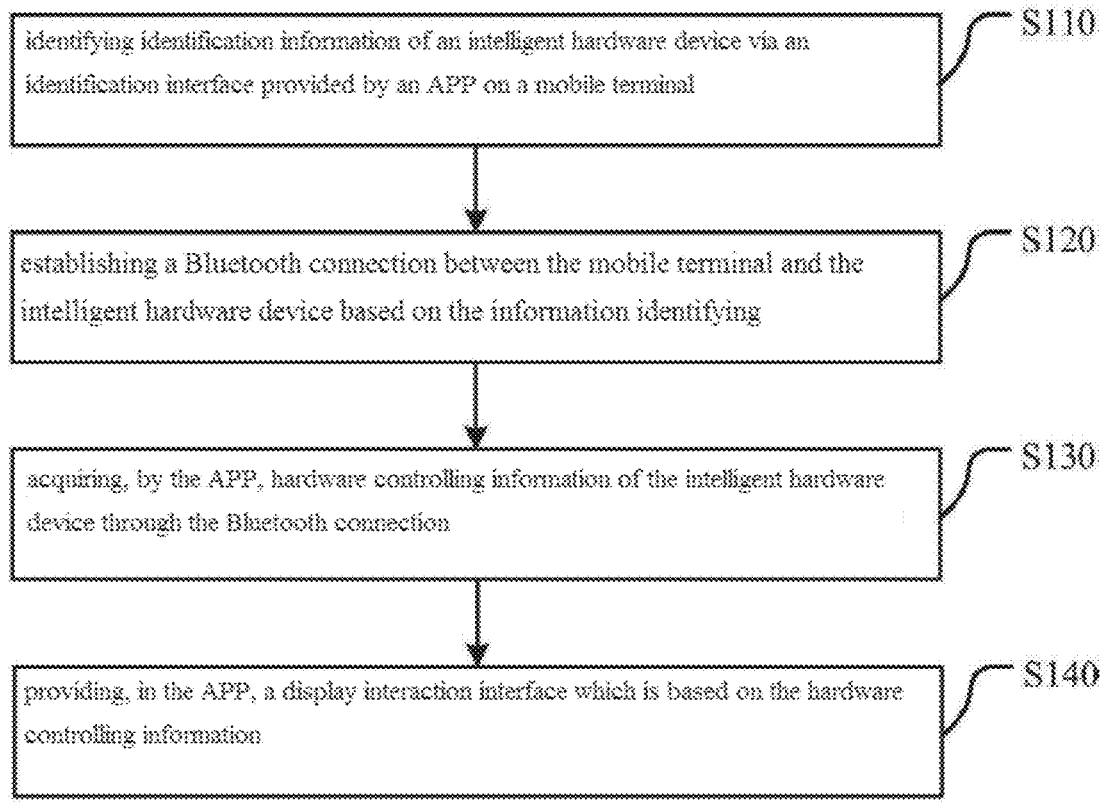
FIG. 1 illustrates a flow chart of a method for realizing centralized management of intelligent hardware devices by an APP according to an embodiment of the present invention.

FIG. 1 illustrates a flow chart of a method for realizing centralized management of intelligent hardware devices by an APP according to an embodiment of the present invention. As shown in FIG. 1, the method comprising:

Step S110, identifying identification information of an intelligent hardware device via an identification interface provided by an APP on a mobile terminal;

Step S120, establishing a bluetooth connection between the mobile terminal and the intelligent hardware device, based on the information identifying;

Step S130, acquiring, by the APP, hardware controlling information of the intelligent hardware device through the bluetooth connection; and Step S140, providing, in the APP, a display interaction interface which is based on the hardware controlling information. In this step, the display interaction interface is provided in the APP based on the hardware controlling information of the intelligent hardware device acquired in Step S130.

Because different intelligent hardware devices have different hardware controlling modes and thus correspondingly have different hardware controlling instructions, the APP needs to acquire the corresponding hardware controlling information from a hardware intelligent device and generate the corresponding display interaction information, to control and manage the hardware intelligent device. The display interaction interface herein has thereon various control buttons and setting menu items for controlling and managing the intelligent hardware device.

It can be seen that, the method shown in FIG. 1 describes the process of information identifying, bluetooth connecting, hardware controlling information acquiring and interaction interface providing between an APP on a mobile terminal and an intelligent hardware device. Because the interaction process relies on the identification interface provided by the APP, the restriction of the one-for-one management model between APPs and intelligent hardware devices in the prior art is broken through, and the management of one APP for multiple intelligent hardware devices can be realized, which simplifies the operation process, and provides the user a more convenient and intuitive experience of intelligent hardware device management.

In an embodiment of the present invention, the identification information of the intelligent hardware device contains information required for establishing the bluetooth connection. On the basis of this, the Step 130 of establishing a bluetooth connection between the mobile terminal and the intelligent hardware device refers to: according to the information required for establishing the bluetooth connection in the identification information and, by using a bluetooth module on the mobile terminal, establishing the bluetooth connection to the intelligent hardware device.

In an embodiment of the present invention, the Step S110 of the method shown in FIG. 1 of identifying identification information of an intelligent hardware device via an identification interface provided by an APP on a mobile terminal comprising: via a code scanning function interface provided by the APP, triggering a scanning module on the mobile terminal to conduct code scanning identifying to a two-dimensional barcode and a barcode of the intelligent hardware device; or, via a text inputting interface provided by the APP, receiving identification information of the intelligent hardware device that is manually inputted.

In an embodiment of the present invention, the method shown in FIG. 1 further comprising: acquiring, by the APP, recording information stored on the intelligent hardware device through the bluetooth connection, and exhibiting the acquired recording information on the display interaction interface.

Figure 5A:
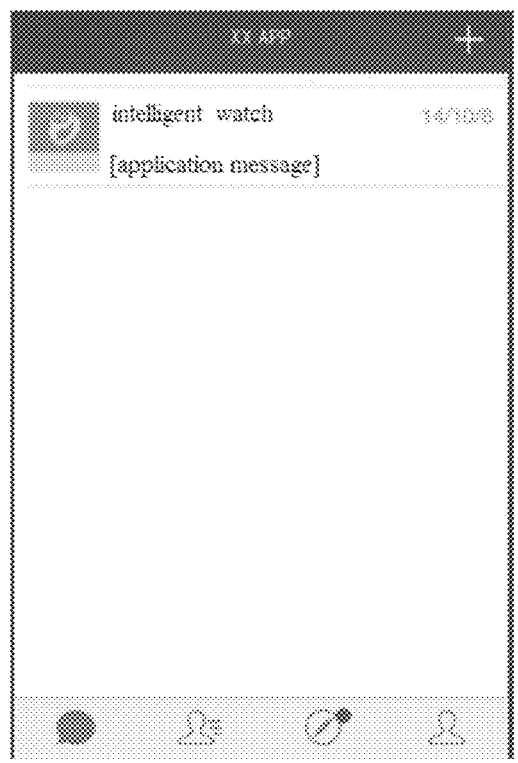
FIG. 5A illustrates a display interaction interface of the management of an intelligent watch by an APP according to an embodiment of the present invention.
Figure 5B:
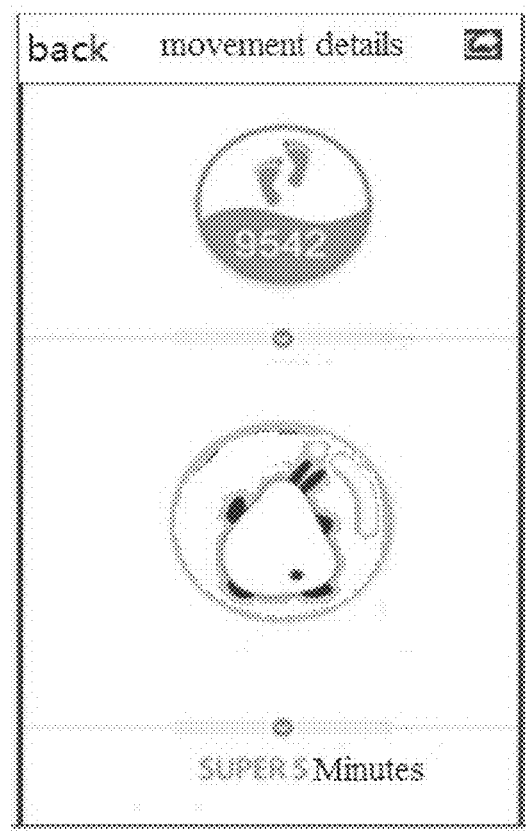
FIG. 5B illustrates a display interaction interface of an intelligent watch according to an embodiment of the present invention.
Figure 5C:
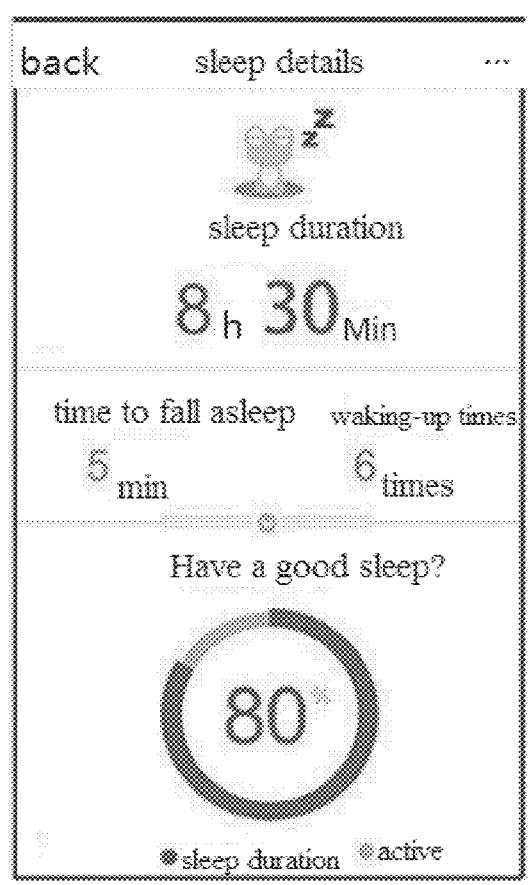
FIG. 5C illustrates a display interaction interface of an intelligent watch according to another embodiment of the present invention.

For example, the intelligent hardware device is particularly an intelligent watch, which can record movement data and sleep data of a user. An APP on a mobile terminal conducts information identifying to the intelligent watch by scanning the two-dimensional barcode of the intelligent watch, and when the identifying is completed, the two establish a bluetooth connection. FIG. 5A illustrates the display interaction interface of the management of an intelligent watch by an APP according to an embodiment of the present invention. The APP acquires the movement data and the sleep data stored on the intelligent hardware device through the bluetooth connection, and exhibits the acquired recording information on the display interaction interface. FIG. 5B illustrates the display interaction interface of the intelligent watch according to an embodiment of the present invention. As shown in FIG. 5B, the display interaction interface shows "movement details", that is, the APP exhibits the acquired movement data of the user on the display interaction interface. FIG. 5C illustrates the display interaction interface of the intelligent watch according to another embodiment of the present invention. As shown in FIG. 5C, the display interaction interface shows "sleep details", that is, the APP exhibits the acquired sleep data of the user on the display interaction interface.

In an embodiment of the present invention, the method shown in FIG. 1 further comprising: the APP acquiring setting information of the intelligent hardware device set by the user via the display interaction interface, and sending the acquired setting information to the intelligent hardware device through the bluetooth connection.

Figure 5D:
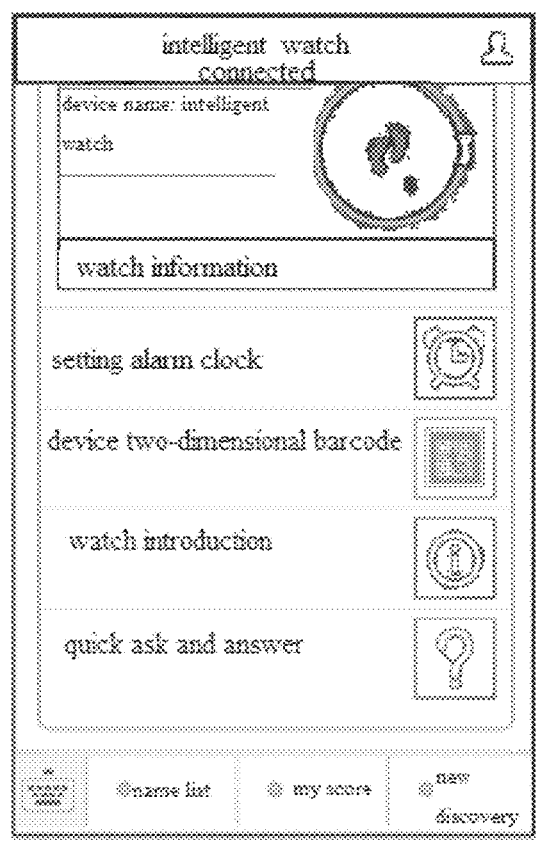
FIG. 5D illustrates a display interaction interface of an intelligent watch according to yet another embodiment of the present invention.

Again referring to the example of the intelligent watch above, FIG. 5D illustrates the display interaction interface of the intelligent watch according to yet another embodiment of the present invention. As shown in FIG. 5D, in the display interaction interface, the user may set the intelligent watch, for example, set alarm clock alarming and target step number; the APP acquires the setting information of the user of the intelligent watch via the display interaction interface, and sends the acquired setting information to the intelligent hardware device through the bluetooth connection; the intelligent watch operates according to the setting information of the user.

In an embodiment of the present invention, the method shown in FIG. 1 further comprising:

Step S150, establishing a connection between the APP and a server corresponding to the intelligent hardware device.

In this step, because in the special embodiment, the identification information of the intelligent hardware device may also contain the address information of the server corresponding to the intelligent hardware device, the APP may, according to the address information of the server and by using a network connected to the mobile terminal, establish the connection to the server.

Step S160, uploading the information acquired from the intelligent hardware device to the server, acquiring historical uploading information of the intelligent hardware device from the server and exhibiting it on the display interaction interface.

Figure 5E:
FIG. 5E illustrates a display interaction interface of an intelligent watch according to still another embodiment of the present invention.

Again referring to the example of the intelligent watch above, the APP establishes a connection to the server corresponding to the intelligent watch. The APP uploads the information acquired from the intelligent watch to the server, acquires historical uploading information of the intelligent watch from the server and exhibits it on the display interaction interface. FIG. 5E illustrates the display interaction interface of the intelligent watch according to still another embodiment of the present invention. As shown in FIG. 5E, the display interaction interface shows the movement trend that is obtained based on the counting up of the historical uploading movement data information.

Figure 5F:
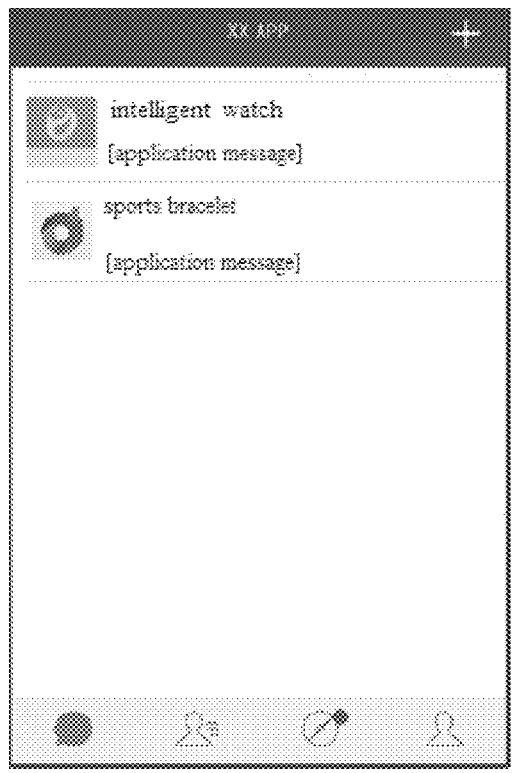
FIG. 5F illustrates a display interaction interface of the management of an intelligent watch and a sports bracelet by an APP according to an embodiment of the present invention.

In the above various embodiments, the identification interface provided by the APP is able to identify identification information of different intelligent hardware devices, to realize centralized management of a plurality of intelligent hardware devices. FIG. 5F illustrates the display interaction interface of the management of an intelligent watch and a sports bracelet by an APP according to an embodiment of the present invention. As shown in FIG. 5F, the identification interface provided by the APP individually identifies the identification information of the intelligent watch and the sports bracelet, to realize the centralized management of the two.

In an embodiment of the present invention, the APP of the above various embodiments is a mobile browser client; the above process is executed by a Webview in the mobile browser client.

Wherein, when conducting the centralized management of a plurality of different intelligent hardware devices, the mobile browser client contains a plurality of Webviews that are one-for-one corresponding to a plurality of different intelligent hardware devices; each of the Webviews executes the above process for its corresponding intelligent hardware device.

Figure 2:
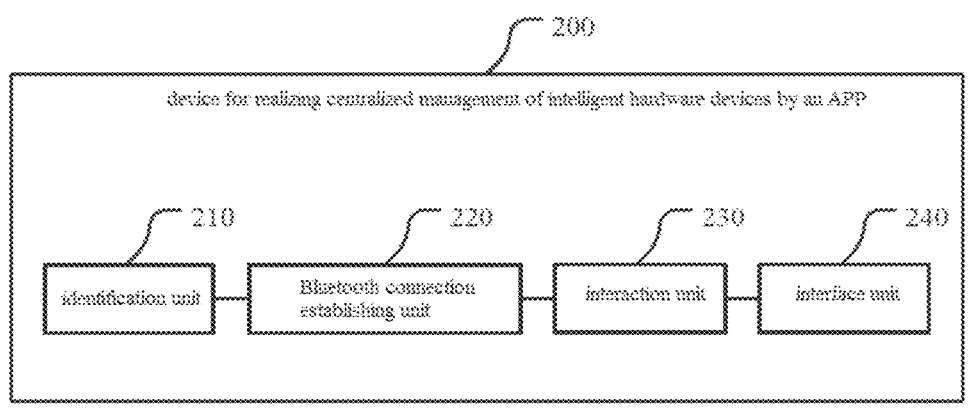
FIG. 2 illustrates a schematic diagram of a device for realizing centralized management of intelligent hardware devices by an APP according to an embodiment of the present invention.

FIG. 2 illustrates the schematic diagram of the device for realizing centralized management of intelligent hardware devices by an APP according to an embodiment of the present invention. As shown in FIG. 2, the device 200 for realizing centralized management of intelligent hardware devices by an APP comprising:

an identification unit 210, adapted for identifying identification information of an intelligent hardware device via an identification interface provided by an APP on a mobile terminal;

a bluetooth connection establishing unit 220, adapted for, establishing a bluetooth connection between the mobile terminal based on the information identifying and the intelligent hardware device;

an interaction unit 230, adapted for, acquiring hardware controlling information of the intelligent hardware device through the bluetooth connection; and an interface unit 240, adapted for providing, in the APP, a display interaction interface which is based on the hardware controlling information.

It can be seen that, the device shown in FIG. 2, by taking advantage of the cooperation of the units, executes the process of information identifying, bluetooth connecting, hardware controlling information acquiring and interaction interface providing between an APP on a mobile terminal and an intelligent hardware device. Because the interaction process relies on the identification interface provided by the APP, the restriction of the one-for-one management model between APPs and intelligent hardware devices in the prior art is broken through, and the management of one APP for multiple intelligent hardware devices can be realized, which simplifies the operation process, and provides the user a more convenient and intuitive experience of intelligent hardware device management.

In an embodiment of the present invention, the identification information of the intelligent hardware device contains information required for establishing the bluetooth connection. On the basis of this, the bluetooth connection establishing unit 220 of the device shown in FIG. 2 is adapted for, according to the information required for establishing the bluetooth connection in the identification information and, by using a bluetooth module on the mobile terminal, establishing the bluetooth connection to the intelligent hardware device.

In an embodiment of the present invention, the identification unit 210 of the device shown in FIG. 2 is adapted for, via a code scanning function interface provided by the APP, triggering a scanning module on the mobile terminal to conduct code scanning identifying to a two-dimensional barcode and a barcode of the intelligent hardware device; or, adapted for, via a text inputting interface provided by the APP, receiving and identifying identification information of the intelligent hardware device that is manually inputted.

In an embodiment of the present invention, the interaction unit 230 of the device shown in FIG. 2 is adapted for, acquiring recording information stored on the intelligent hardware device through the bluetooth connection, and the interface unit 240 is adapted for exhibiting the acquired recording information on the display interaction interface.

Again referring to the example of the intelligent watch above, the identification unit 210 conducts information identifying to the intelligent watch by scanning the two-dimensional barcode of the intelligent watch, and when the identifying is completed, as shown in FIG. 5A, the mobile terminal establishes a bluetooth connection to the intelligent watch. The interaction unit 230 acquires the movement data information and the sleep data information stored on the intelligent hardware device through the bluetooth connection, and the interface unit 240 exhibits the acquired recording information on the display interaction interface. The display interaction interface exhibiting the movement data is shown in FIG. 5B, and the display interaction interface exhibiting the sleep data is shown in FIG. 5C.

In an embodiment of the present invention, the interface unit 240 of the device shown in FIG. 2 is further adapted for acquiring setting information of the intelligent hardware device set by the user via the display interaction interface, and the interaction unit 230 is further adapted for sending the setting information to the intelligent hardware device through the bluetooth connection.

Again referring to the example of the intelligent watch above, the interface unit 240, via the display interaction interface shown in FIG. 5D, acquires the setting information of the user of the intelligent watch, such as alarm clock alarming, target step number and so on, and the interaction unit 230 sends the acquired setting information to the intelligent hardware device through the bluetooth connection, so that the intelligent watch operates according to the setting information of the user.

Figure 3:
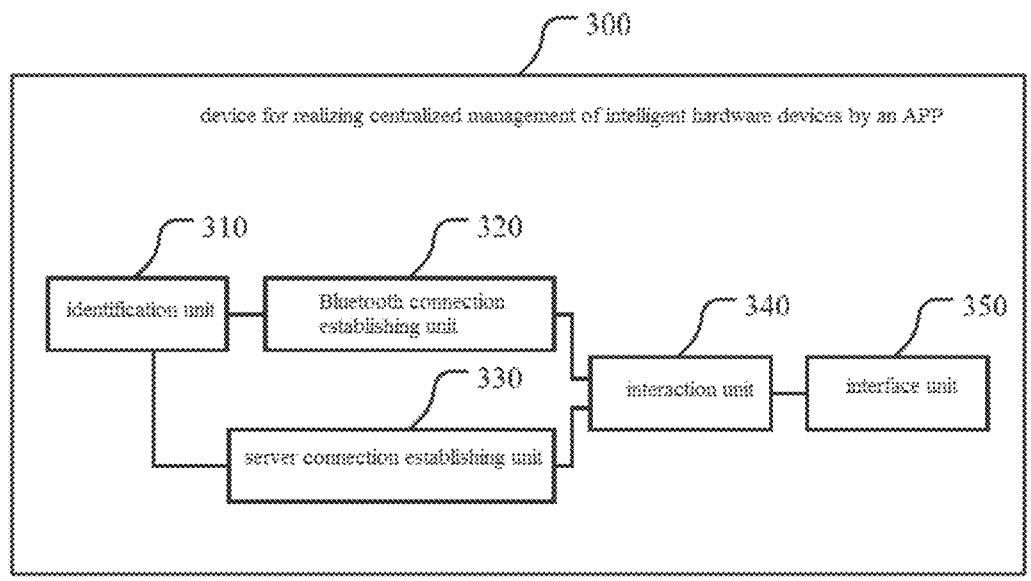
FIG. 3 illustrates a schematic diagram of a device for realizing centralized management of intelligent hardware devices by an APP according to another embodiment of the present invention.

FIG. 3 illustrates the schematic diagram of the device for realizing centralized management of intelligent hardware devices by an APP according to another embodiment of the present invention. As shown in FIG. 3, the device 300 for realizing centralized management of intelligent hardware devices by an APP comprising: an identification unit 310, a bluetooth connection establishing unit 320, a server connection establishing unit 330, an interaction unit 340 and an interface unit 350.

Wherein, the identification unit 310, the bluetooth connection establishing unit 320 and the interface unit 350 are correspondingly the same as the identification unit 210, the bluetooth connection establishing unit 220 and the interface unit 240 of the device as shown in FIG. 2, respectively.

The server connection establishing unit 330 is adapted for establishing a connection to a server corresponding to the intelligent hardware device.

In a special embodiment, the identification information of the intelligent hardware device may also contain the address information of the server corresponding to the intelligent hardware device, and the server connection establishing unit 330 is adapted for, according to the address information of the server and by using a network that is connected to the mobile terminal, establishing the connection to the server.

The interaction unit 340 is further adapted for uploading the information acquired from the intelligent hardware device to the server, acquiring historical uploading information of the intelligent hardware device from the server and exhibiting it on the display interaction interface.

Again referring to the example of the intelligent watch above, the server connection establishing unit 330, according to the address information of the server and by using a network connected to the mobile terminal, establishes a connection to the server corresponding to the intelligent watch. The interaction unit 340 uploads the information acquired from the intelligent watch to the server, acquires historical uploading information of the intelligent watch from the server and exhibiting it on the display interaction interface. As shown in FIG. 5E, the display interaction interface shows the movement trend that is obtained based on the counting up of the historical uploading movement data information.

On the basis of the above various embodiments, the identification unit 310 is adapted for, according to the identification interface provided by the APP, identifying identification information of different intelligent hardware devices, to realize centralized management of a plurality of intelligent hardware devices. As shown in FIG. 5F, the identification unit 310, according to the identification interface provided by the APP, individually identifies the identification information of the intelligent watch and the sports bracelet, to realize the centralized management of the two. In other embodiments of the present invention, the APP may access to more intelligent hardware devices, to realize one-for-many centralized management.

Figure 4:
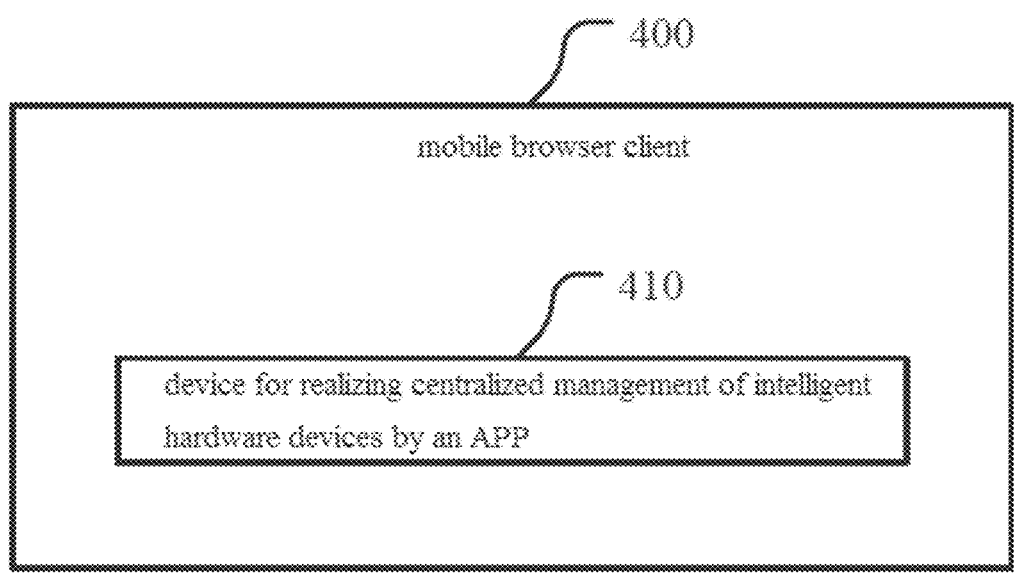
FIG. 4 illustrates a schematic diagram of a mobile browser client according to an embodiment of the present invention.

FIG. 4 illustrates the schematic diagram of the mobile browser client according to an embodiment of the present invention. As shown in FIG. 4, the mobile browser client 400 comprising: the device 410 for realizing centralized management of intelligent hardware devices by an APP as described in any one of the above embodiments.

In an embodiment of the present invention, when conducting the centralized management of a plurality of different intelligent hardware devices, the mobile browser client shown in FIG. 4 comprising a plurality of the devices for realizing centralized management of intelligent hardware devices by an APP as described in any one of the above embodiments that are one-for-one corresponding to a plurality of different intelligent hardware devices.

In conclusion, the technical solutions provided by the present invention execute the process of information identifying, bluetooth connecting, hardware controlling information acquiring and interaction interface providing between an APP on a mobile terminal and an intelligent hardware device. Because the interaction process relies on the identification interface provided by the APP, the restriction of the one-for-one management model between APPs and intelligent hardware devices in the prior art is broken through, and the management of one APP for multiple intelligent hardware devices can be realized, which simplifies the operation process, and the uploading and downloading of the data of the intelligent hardware devices and the recording and counting up of historical data can be completed in one APP, which simplifies the operation process, and provides the user a more convenient and intuitive experience of intelligent hardware device management.

It should be noted that:

Algorithm and display provided herein are not inherently related to any particular computer, virtual system or other equipment. Various general systems may also be used with the teaching based on the disclosure. According to the above description, the required structure for constructing such a system is obvious. In addition, the present invention is not directed to any particular programming language. It should be understood that a variety of programming languages can be used to implement the disclosed contents of the present invention as described herein, and the above description of the particular programming language is to disclose the best mode for carrying out of the present invention.

Many details are discussed in the specification provided herein. However, it should be understood that the embodiments of the present invention can be implemented without these specific details. In some examples, the well-known methods, structures and technologies are not shown in detail so as not to obscure the understanding of the description.

Similarly, it should be understood that, in order to simplify the disclosure and to facilitate the understanding of one or more of various aspects thereof, in the above description of the exemplary embodiments of the present invention, various features of the present invention may sometimes be grouped together into a single embodiment, accompanying figure or description thereof. However, this method of disclosing should not be construed as follows: the present invention for which the protection is sought specifies more features than those explicitly disclosed in each of claims. More specifically, as reflected in the following claims, the features of an inventive aspect are fewer than all features of a single embodiment as disclosed above. Therefore, claims corresponding to specific embodiments are definitely incorporated into the specific embodiments, and each claim itself can be considered as a separate embodiment of the present invention.

It should be understood by those skilled in the art that modules of the device in an embodiment can be self-adaptively modified and arranged in one or more devices different from the embodiment. Modules, units or components in the embodiment can be combined into one module, unit or component, and can also be divided into more sub-modules, sub-units or sub-components. Except that at least some of features and/or processes or units are mutually exclusive, various combinations can be adopted to combine all the features disclosed in specification (including claims, abstract and accompanying figures) and all the processes or units of any methods or devices as disclosed herein. Unless otherwise definitely stated, each of features disclosed in specification (including claims, abstract and accompanying figures) may be replaced by an alternative feature having same, equivalent or similar purpose.

In addition, it should be understood by those skilled in the art, although some embodiments as discussed herein comprise some but not all of features included in other embodiments, combination of features in different embodiment means that the combination is within the scope of the present invention and forms a different embodiment. For example, in the following claims, any one of the embodiments for which the protection is sought can be used in any combination manner.

Embodiments regarding the parts or components in the present invention may be implemented in hardware, or implemented by software modules running on one or more processors, or implemented by the combination thereof. A person skilled in the art should understand that, in practice, a microprocessor or a digital signal processor (DSP) may be used to realize some or all of the functions of some or all of the parts or components of the device and mobile browser client for realizing centralized management of intelligent hardware devices by an APP according to the embodiments of the present invention. The present invention may further be implemented as device programs (for example, computer programs and computer program products) for executing some or all of the methods as described herein. Such programs for implementing the present invention may be stored on a computer readable medium, or have the form of one or more signals. Such signals may be downloaded from the internet websites, or be provided on a carrier signal, or be provided in other manners.

Figure 6:
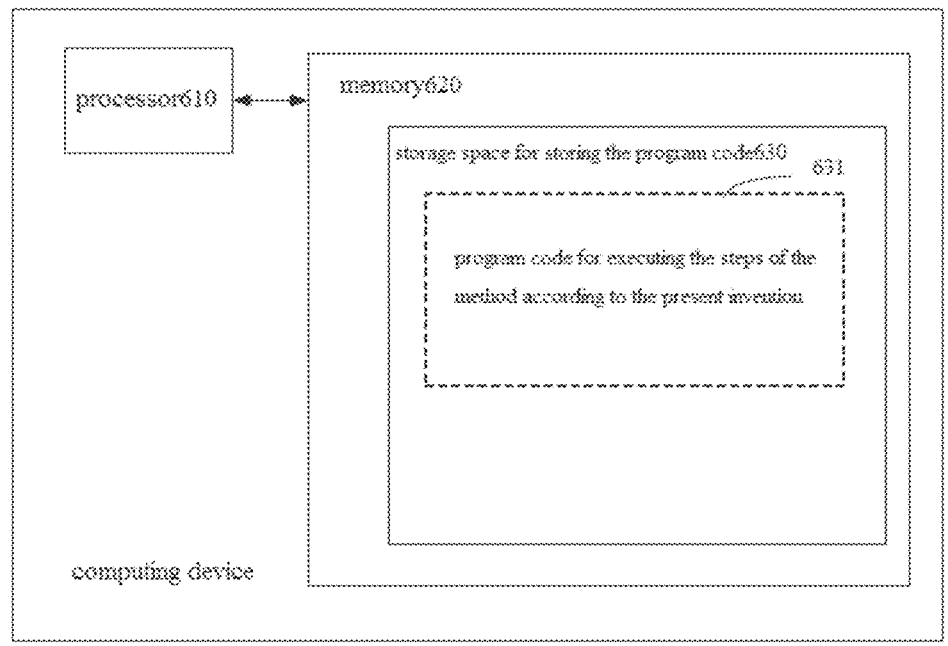
FIG. 6 schematically illustrates a block diagram of a computing device for executing a method according to the present invention.
Figure 7:
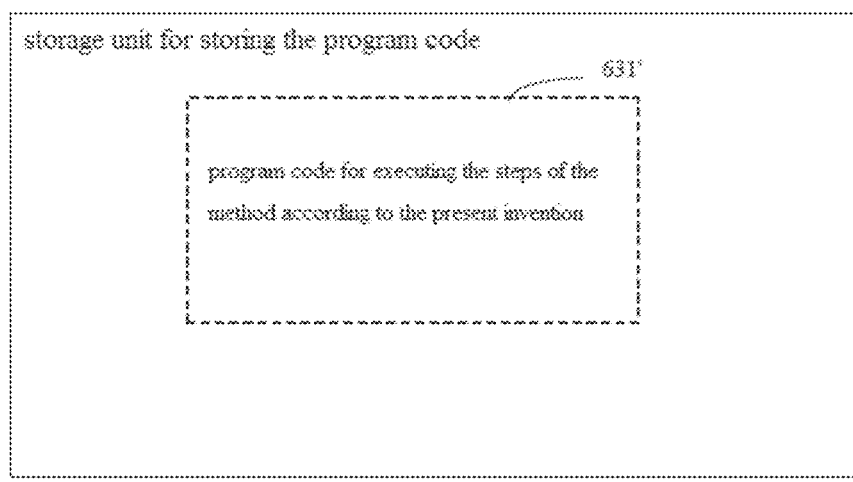
FIG. 7 schematically illustrates a storage unit for containing or carrying a program code for implementing a method according to the present invention.

For example, FIG. 6 illustrates a block diagram of a computing device for executing the method according to the present invention. The computing device conventionally comprises a processor 610 and a computer program product or computer-readable medium in the form of a memory 620. The memory 620 may be an electronic memory such as a flash memory, EEPROM (Electrically Erasable Programmable Read-Only Memory), EPROM, hard disk or ROM. The memory 620 has a storage space 630 for a program code 631 for executing any step of the above method. For example, the storage space 630 for the program code may comprise program codes 631 for respectively implementing steps of the above method. These program codes may be read from one or more computer program products or written into the one or more computer program products. These computer program products comprise program code carriers such as hard disk, compact disk (CD), memory card, floppy disk or the like. Such computer program products are usually portable or fixed memory units as shown in FIG. 7. The memory unit may have a storage section, a storage space or the like arranged in a similar way to the memory 620 in the computing device of FIG. 6. The program code may for example be compressed in a suitable form. Usually, the memory unit includes a computer-readable code 631', namely, a code could be read by a processor such as 610. When these codes are by the computing device, the codes execute each of the steps of the method described above.

It should be noted that the above-described embodiments are intended to illustrate but not to limit the present invention, and alternative embodiments may be devised by the person skilled in the art without departing from the scope of claims as appended. In the claims, any reference symbols between brackets should not be construed as a limitation of the claims. The wording "comprise" does not exclude the presence of elements or steps not listed in a claim. The wording "a" or "an" preceding an element does not exclude the presence of a plurality of such elements. The present invention may be realized by means of hardware comprising a number of different elements and by means of a suitably programmed computer. In the device claim listing a plurality of units, some of these units may be embodied in the same hardware. The wordings "first", "second", and "third", etc. do not denote any order. These wordings may be interpreted as names.

Furthermore, it should also be note that, the languages that are used in the description are chosen mainly for the purposes of readability and teaching, and are not for interpreting or limiting the subject matter of the present invention. Therefore, various modifications and alterations are apparent for a person skilled in the art without departing from the scope and spirit of the attached claims. Regarding the scope of the present invention, the disclosure of the present invention is illustrative, rather than restrictive, and the scope of the present invention is defined by the attached claims.

The present invention can be applied to computer systems/servers, which can be operated together with various other general-purpose or special-purpose computing system environments or configurations. The examples of well-known computing systems, environments and/or configurations that are suitable for use with the computer systems/servers include, but not limited to: personal computer systems, server computer systems, thin clients, thick clients, hand-held or laptop devices, microprocessor-based systems, set top boxes, programmable consumer electronic products, network personal computers, small computer systems, large computer systems and distributed cloud computing technique environments that comprise any of the above systems, etc.

The computer systems/servers can be described in the general context of computer system executable instructions (such as program modules) that are executed by the computer systems. In general, the program modules may include routines, programs, object programs, components, logics, data structures, etc., which execute specific tasks or implement specific abstract data types. The computer systems/servers can be implemented in distributed cloud computing environments, and in distributed cloud computing environments, tasks are executed by remote processing devices that are linked by a communication network. In distributed cloud computing environments, program modules can be located on a local or remote computing system storage medium including storage devices.

The "one embodiment", "an embodiment" or "one or more embodiments" stated herein indicates that, the specific features, structures or characteristics that are described with reference to the embodiment are included in at least one embodiment of the present invention. Furthermore, it should be noted that, the wordings such as "in an embodiment" herein do not necessarily refer to the same one embodiment.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method for realizing centralized management of intelligent hardware devices by an APP, comprises:
   recognizing identification information of an intelligent hardware device via an identification interface provided by an APP on a mobile terminal;
   establishing a bluetooth connection between the mobile terminal and the intelligent hardware device based on the information recognizing;
   acquiring, by the APP, hardware controlling information of the intelligent hardware device through the bluetooth connection; and providing in the APP, a display interaction interface which is based on the hardware controlling information;
   the identification information of the intelligent hardware device further contains address information of the server corresponding to the intelligent hardware device;
   wherein the method further comprises:
   according to the address information of the server and by using a network connected to the mobile terminal, establishing a connection between the APP and a server corresponding to the intelligent hardware device.

2. The method according to claim 1, wherein the identification information of the intelligent hardware device contains information required for establishing the bluetooth connection; and the step of establishing a bluetooth connection between the mobile terminal and the intelligent hardware device comprises: according to the information required for establishing the bluetooth connection in the identification information and, by using a bluetooth module on the mobile terminal, establishing the bluetooth connection to the intelligent hardware device.

3. The method according to claim 1, wherein the step of recognizing identification information of an intelligent hardware device via an identification interface provided by an APP on a mobile terminal comprises:
   via a code scanning function interface provided by the APP, triggering a scanning module on the mobile terminal to conduct code scanning identifying to a two-dimensional barcode and a barcode of the intelligent hardware device;
   or,
   via a text inputting interface provided by the APP, receiving identification information of the intelligent hardware device that is manually inputted.

4. The method according to claim 1, wherein the method further comprises:
   acquiring, by the APP, recording information stored on the intelligent hardware device through the bluetooth connection and exhibiting the acquired recording information on the display interaction interface.

5. The method according to claim 1, wherein the method further comprises:
   acquiring, by the APP, setting information of the intelligent hardware device set by the user via the display interaction interface, and sending the acquired setting information to the intelligent hardware device through the bluetooth connection.

6. The method according to claim 1, wherein the method further comprises:
   uploading the information acquired from the intelligent hardware device to the server, acquiring historical uploading information of the intelligent hardware device from the server and exhibiting it on the display interaction interface.

7. The method according to claim 1, wherein the identification interface provided by the APP is able to identify identification information of different intelligent hardware devices, to realize centralized management of a plurality of intelligent hardware devices.

8. The method according to claim 1, wherein
   the APP is a mobile browser client; and
   the above process is executed by a Webview in the mobile browser client.

9. The method according to claim 8, wherein,
   the mobile browser client contains a plurality of Webviews that are one-for-one corresponding to a plurality of different intelligent hardware devices; and
   each of the Webviews executes the above process for its corresponding intelligent hardware device.

10. A device, comprising:
a memory having instructions stored thereon;
a processor configured to execute the instructions to perform operations for realizing centralized management of intelligent hardware devices by an APP, the operations comprising:
recognizing identification information of an intelligent hardware device via an identification interface provided by an APP on a mobile terminal;
establishing a bluetooth connection between the mobile terminal and the intelligent hardware device based on the information recognizing;
acquiring hardware controlling information of the intelligent hardware device through the bluetooth connection; and
providing, in the APP, a display interaction interface which is based on the hardware controlling information;
the identification information of the intelligent hardware device further contains address information of the server corresponding to the intelligent hardware device;
wherein the method further comprises:
according to the address information of the server and by using a network connected to the mobile terminal, establishing a connection between the APP and a server corresponding to the intelligent hardware device.

11. The device according to claim 10, wherein
the identification information of the intelligent hardware device contains information required for establishing the bluetooth connection; and
establishing a bluetooth connection between the mobile terminal and the intelligent hardware device based on the information recognizing comprising the operations of:
according to the information required for establishing the bluetooth connection in the identification information and, by using a bluetooth module on the mobile terminal, establishing the bluetooth connection to the intelligent hardware device.

12. The device according to claim 10, wherein recognizing identification information of an intelligent hardware device via an identification interface provided by an APP on a mobile terminal comprising the operations of :
via a code scanning function interface provided by the APP, triggering a scanning module on the mobile terminal to conduct code scanning identifying to a two-dimensional barcode and a barcode of the intelligent hardware device; or, adapted for, via a text inputting interface provided by the APP, receiving and recognizing identification information of the intelligent hardware device that is manually inputted.

13. The device according to claim 10, wherein
acquiring hardware controlling information of the intelligent hardware device through the bluetooth connection comprising the operation of:
acquiring recording information stored on the intelligent hardware device through the bluetooth connection; and
providing, in the APP, a display interaction interface which is based on the hardware controlling information comprising the operation of:
exhibiting the acquired recording information on the display interaction interface.

14. The device according to claim 10, wherein
providing, in the APP, a display interaction interface which is based on the hardware controlling information further comprising the operation of:
acquiring setting information of the intelligent hardware device set by the user via the display interaction interface; and
acquiring hardware controlling information of the intelligent hardware device through the bluetooth connection further comprising the operation of:
sending the setting information to the intelligent hardware device through the bluetooth connection.

15. The device according to claim 10, wherein the operations further comprises:
uploading the information acquired from the intelligent hardware device to the server, acquiring historical uploading information of the intelligent hardware device from the server and exhibiting it on the display interaction interface.

16. The device according to claim 10, wherein recognizing identification information of an intelligent hardware device via an identification interface provided by an APP on a mobile terminal comprising the operation of:
according to the identification interface provided by the APP, recognizing identification information of different intelligent hardware devices, to realize centralized management of a plurality of intelligent hardware devices.

17. A non-transitory computer readable medium that having instructions stored thereon that, when executed by at least one processor, cause at least one processor to perform operations for realizing centralized management of intelligent hardware devices by an APP, the operations comprising:
recognizing identification information of an intelligent hardware device via an identification interface provided by an APP on a mobile terminal;
establishing a bluetooth connection between the mobile terminal and the intelligent hardware device based on the information recognizing;
acquiring, by the APP, hardware controlling information of the intelligent hardware device through the bluetooth connection; and
providing, in the APP, a display interaction interface which is based on the hardware controlling information;
the identification information of the intelligent hardware device further contains address information of the server corresponding to the intelligent hardware device;
wherein the method further comprises:
according to the address information of the server and by using a network connected to the mobile terminal, establishing a connection between the APP and a server corresponding to the intelligent hardware device.

* * * * *